United States Patent [19]

Miller, Jr.

[11] Patent Number: 5,154,760
[45] Date of Patent: Oct. 13, 1992

[54] POLYAMIDE RESIN COMPOSITIONS FOR USE AS LAMINATING INK RESIN BINDERS

[75] Inventor: George E. Miller, Jr., Savannah, Ga.

[73] Assignee: Union Camp Corporation, Wayne, N.J.

[21] Appl. No.: 618,767

[22] Filed: Nov. 27, 1990

[51] Int. Cl.$^5$ .............................................. C09D 11/02
[52] U.S. Cl. ....................................... 106/20; 106/27; 528/338; 528/339.3
[58] Field of Search ............................ 106/20, 27, 30; 528/339.3, 338

[56] References Cited

U.S. PATENT DOCUMENTS

| | | | |
|---|---|---|---|
| 2,149,286 | 1/1937 | Graves | 528/339.3 |
| 4,066,585 | 1/1978 | Schepp et al. | 106/27 |
| 4,243,702 | 1/1981 | Walsh | 106/27 |
| 4,514,540 | 4/1985 | Peck | 106/20 |
| 4,921,932 | 5/1990 | Tamura et al. | 528/339.3 |
| 5,025,043 | 6/1991 | Smith | 524/607 |
| 5,026,755 | 6/1991 | Kyeglis et al. | 106/20 |

FOREIGN PATENT DOCUMENTS 1718504 2/1986 European Pat. Off. ......... 528/339.3

*Primary Examiner*—Mark L. Bell
*Assistant Examiner*—Helene Klemanski
*Attorney, Agent, or Firm*—William K. Wissing

[57] ABSTRACT

A polyamide resin composition for use as laminating ink resin binder is provided by the condensation reaction product of dimerized fatty acids having 36 carbon atoms, at least one dibasic acid, at least one $C_1$–$C_4$ alkyl diamine and at least one piperazine-like diamine. The equivalents of amine groups in the composition are substantially equal to the equivalents of carboxyl groups, where 30 to 50 equivalent perecent of the carboxyl groups are contributed by the dibasic acid component and 73 to 93 equivalent percent of the amine groups are contributed by the piperazine-like diamine component. Printing inks with the polyamide resin composition of this invention are also provided.

15 Claims, No Drawings

POLYAMIDE RESIN COMPOSITIONS FOR USE AS LAMINATING INK RESIN BINDERS

FIELD OF THE INVENTION

This invention relates to polyamide resin compositions for use as laminating ink resin binders. More particularly, the invention relates to high piperazine-like diamine/high dibasic acid polyamide resin compositions that possess desirable properties such as good ethanol solubility and reducibility, and have good viscosity stability in solution.

BACKGROUND OF THE INVENTION

In the manufacture of printing inks, efforts are continuously made to develop new and improved polyamide compositions useful as pigment binders in inks for printing a variety of substrates. In particular demand are those inks which can be printed or laminated on polyolefin substrates such as polyethylene. These inks must possess a number of qualities to be commercially useful, including good ethanol solubility and reducibility, and good viscosity stability in solution among others.

Polyamides comprising dimerized fatty acids are known to be useful in the manufacture of printing inks and in adhesive applications. According to U.S. Pat. No. 3,377,303, polyamide compositions including a piperazine or dipiperdyl type diamine component are disclosed as suitable for hot melt binding. Good adhesion to vinyl substrates by these polyamide compositions are shown, however such adhesive compositions are generally poorly soluble in alcohol and possess other properties suitable for adhesion but generally unsuited for applications as an ink resin binder.

U.S. Pat. No. 3,652,469 teaches polymeric fatty acid polyamide resins obtained by reacting an acid mixture of a polymeric fatty acid and a low aliphatic monocarboxylic acid with an amine mixture of an alkylene diamine and a polyhexamethylene polyamine. The resins are disclosed as being particularly useful in flexographic ink. Although these products have good solubility in alcohol achieved in part through the condensation of a monobasic acid as part of the acid component, the resultant lower molecular weight product results in less desirable tensile properties. Similarly, Re. 28,533 discloses synthetic polyamides prepared by condensing a monocarboxylic acid, diamine and dimerized fatty acid. Again, the lower molecular weight compositions obtained by condensing inter alia a monocarboxylic acid achieves ethanol solubility generally at the expense of tensile properties. According to U.S. Pat. No. 4,571,267, alcohol-soluble polyamides and printing inks are disclosed prepared by condensing an acid component of dimerized fatty acids, at least one aliphatic unbranched monocarboxylic acid and at least one aliphatic branched monocarboxylic acid with ethylenediamine and hexamethylenediamine as the amine component.

Thus there is a need for polyamide resin compositions for use as laminating ink resin binders which possess desirable properties such as good ethanol solubility and reducibility, good viscosity stability in solution and good softening points.

SUMMARY OF THE INVENTION

It has been found that in accordance with the present invention a high piperazine-like diamine/high dibasic acid polyamide resin composition has properties especially suited for use as an ink binder resin. More particularly it has been found that excellent results are obtained with polyamide resin compositions that comprise the condensation reaction product of a $C_{36}$ dimerized fatty acid, at least one dibasic acid, at least one $C_1$-$C_4$ alkyl diamine and at least one piperazine-like diamine, the equivalents of amine groups being substantially equal to the equivalents of carboxyl groups, where 30 to 50 equivalent percent of the carboxyl groups are contributed by the dibasic acid component and 73 to 93 equivalent percent of the amine groups are contributed by the piperazine-like diamine component.

Further provided by this invention is a printing ink comprising solvent, a polyamide resin composition for laminating ink resin binders in accordance with this invention and a colorant distributed through the composition in an effective amount sufficient to impart a predetermined color to the resulting composition.

DETAILED DESCRIPTION OF THE PREFERRED EMBODIMENT

The polymerized fatty acids useful in the present invention can be obtained by the polymerization of olefinically unsaturated monocarboxylic acids containing 16 to 23 carbon atoms, such as oleic acid, linoleic acid, linolenic acid, eleostearic acid and the like. Dicarboxylic acids produced in this manner, that is, when two moles of the monocarboxylic acid are combined, are referred to as dimer acids. Processes for the production of dimer acids are well known to the art. $C_{36}$ dimer acids obtained by the dimerization of an unsaturated $C_{18}$ a acid such as oleic acid, linoleic acid and mixtures thereof (e.g. tall oil fatty acids) are especially useful and advantageously employed for the preparation of the polyamide resin compositions of this invention. A $C_{36}$ dimerized fatty acid as referred to herein refers to fatty acids that have as their principal component a $C_{36}$ dicarboxylic acid and typically have an acid value in the range 180-215 and neutral equivalent from 265-310. $C_{36}$ dimerized fatty acids containing less than 30% by weight by-product acids including monobasic acids, trimer acids or higher polymer acids are especially useful for this invention. It is even more advantageous if the dimer acid is hydrogenated prior to use. The dimer acids may also be molecularly distilled or otherwise purified to increase the $C_{36}$ dimer content to 90% or more.

Another acid component in the condensation reaction to prepare the polyamide resin composition of this invention is a dibasic acid or mixture of dibasic acids. $C_6$ to $C_{10}$ dibasic acids are believed to be useful in this invention and examples include azelaic acid, sebacic acid and adipic acid. Conveniently, azelaic acid is preferred. The dibasic acids which can be used in this invention are well known in the art as is their preparation and many are readily available commercially.

An amine component reactant in this invention is a $C_1$ to $C_4$ alkyl diamine or mixtures of $C_1$ to $C_4$ alkyl diamines. The diamines which can be used in this invention are well known in the art as is their preparation and many are readily available commercially. The selection of the particular diamine for use in the preparation of the resinous binder of the present invention is dependent upon the properties desired in the compositions of the present invention. It should be appreciated that use of different types of diamines in the preparation of the resinous binder will change the viscosity and melt point of the resinous binders which are obtained. Conveniently, ethylenediamine (EDA) is the preferred diamine in this invention.

A further amine component reactant in this invention is a piperazine-like diamine or mixtures of piperazine-like diamines. The term "piperazine-like diamine" refers to a compound of the formula YN<Z>NH where Z is selected from the group consisting of

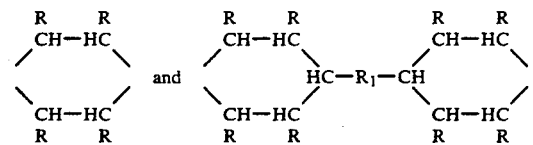

where R is selected from the group consisting of hydrogen and alkyl groups having from 1 to 6 carbon atoms and $R_1$ is a divalent aliphatic hydrocarbon group having at least one carbon atom, Y is selected from the group consisting of hydrogen, $R'NH_2$ and $R'OH$ where $R'$ is a divalent alkylene radical having from 1 to 6 carbon atoms. Of the piperazine-like diamines, piperazine is conveniently preferred. Other piperazine-like diamines such as aminoethyl piperazine and dipiperidyl propane are expected to be useful. The piperazine-like diamines which can be used in this invention are well known in the art as is their preparation and many are readily available commercially.

The amount of reactants present is expressed as equivalent percent. Generally, 30 to 50 equivalent percent of the carboxyl groups are contributed by the dibasic acid component and 73 to 93 equivalent percent of the amine groups are contributed by the piperazine-like diamine component. The polyamide resin composition of this invention is prepared with the equivalents of amine groups employed being substantially equal to the equivalents of carboxyl groups employed. However, slight excess on the order of up to about 10%, preferably about 2 to about 6, of amine groups are within the term "substantially equal." Preferably 35 to 45 equivalent percent of the carboxyl groups are contributed by the dibasic acid component, 55 to 65 equivalent percent of the carboxyl groups are contributed by the dimerized fatty acid component and 78 to 88 equivalent percent of the amine groups are contributed by the piperazine-like diamine component.

The polyamide composition of the present invention can be prepared by standard condensation reactions known to those in the art. For example, the polyamide composition of the invention can be prepared by reacting the acid components with the amine components optionally in the presence of a catalyst such as phosphoric acid at a condensation temperature generally in the range from 150° to 250° C. until the reaction is completed. The order of addition of the reactants is not critical.

The polyamide compositions of this invention are characterized by having physical properties that render them especially useful for laminating ink resin binders. In particular, the polyamide resin compositions of the invention have good ethanol solubility and reducibility, good viscosity stability and good softening points as well as possessing other desirable properties.

Also provided by this invention is a printing ink comprising solvent, the polyamide resin composition in accordance with this invention and a colorant distributed through the composition in an effective amount sufficient to impart a predetermined color to the resulting composition.

Suitable solvents for use in the manufacture of printing inks are the short chain aliphatic alcohols having from 2 to 4 carbon atoms which are commonly used in this field. An example of a suitable solvent is ethanol.

Another ingredient of the printing ink of this invention is the colorant. The generic term colorant is specifically used in this specification in that it is intended to refer to both pigments and dyes which impart a distinct color to the composition. The purpose of any colorant is to provide contrast between the color of the substrate and the color of ink in order to provide a visually identifiable indicia on the substrate.

EXAMPLES

Example 1

1788.15 g of commercially available $C_{36}$ dimerized fatty acid (65 equivalent percent) (UNIDYME 14 ™ lot no. 758, sold commercially by Union Camp Corp., Wayne, NJ) was charged to a four neck round bottom flask fitted with a thermometer. With the dimerized fatty acid was also charged 316.50 g azelaic acid (35 equivalent percent). The mixture was heated and agitated under a nitrogen blanket to approximately 100° C. when 322.80 g piperazine (78 equivalent percent) was added followed by 72.55 g ethylenediamine (25 equivalent percent EDA). The mixture was then heated to 140° C. to begin liberating water from the condensation reaction. Heating was continued until the reaction mixture reached approximately 230° C. The extent of the reaction was monitored by the acid number and amine number which were found to be 7.7 and 11.0 respectively. 4.0 g of EDA was added as an amine correction to achieve proper stoichiometry and control viscosity. Three drops of $H_3PO_4$ was added as a catalyst. The reaction was held at 230° C. until the completion of the reaction, about 4 hours. Finally, a vacuum of down to 65 mmHg in the vessel was applied for about 2 more hours at 230° C.

Example 2

The general procedure of Example 1 was followed except that the following amounts of reactants were employed

| UNIDYME 14 ™ | 1861.55 g |
|---|---|
| | (70 equivalent percent) |
| Azelaic Acid | 262.25 g |
| | (30 equivalent percent) |
| EDA | 84.16 g |
| | (30 equivalent percent) |
| Piperazine | 292.05 g |
| | (73 equivalent percent) |

1.4 g of EDA was added during the reaction as an amine correction.

Example 3

The general procedure of Example 2 was followed except that 6.0 g of EDA was added during the reaction as an amine correction.

Example 4

The general procedure of Example 2 was followed except that 5.9 g EDA was added during the reaction as an amine correction.

Example 5

The general procedure of Example 1 was followed except that the following amounts of reactants were employed

| UNIDYME 14 ™ | 1762.07 g |
| --- | --- |
| | (62.9 equivalent percent) |
| Azelaic Acid | 341.63 g |
| | (37.1 equivalent percent) |
| EDA | 88.65 g |
| | (30.0 equivalent percent) |
| Piperazine | 307.64 g |
| | (73.0 equivalent percent) |

5.8 g of EDA was added during the reaction as an amine correction.

Example 6

The general procedure of Example 2 was followed except that 3.3 g EDA was added during the reaction as an amine correction.

Example 7

The general procedure of Example 2 was repeated.

Example 8

The general procedure of Example 2 was repeated.

Example 9

The procedure of Example 1 was followed except that the following amounts of reactants were employed:

| UNIDYME 14 ™ | 1708.33 g |
| --- | --- |
| | (60 equivalent percent) |
| Azelaic Acid | 374.37 g |
| | (40 equivalent percent) |
| EDA | 66.07 g |
| | (22 equivalent percent) |
| Piperazine | 351.23 g |
| | (82 equivalent percent) |

1.4 g of EDA was added during the reaction as an amine correction.

Example 10

The general procedure of Example 1 was followed except that the following amounts of reactants were employed:

| UNIDYME 14 ™ | 1826.50 g |
| --- | --- |
| | (67.5 equivalent percent) |
| Azelaic Acid | 289.08 g |
| | (32.5 equivalent percent) |
| EDA | 91.34 g |
| | (32.0 equivalent percent) |
| Piperazine | 293.09 g |
| | (72.0 equivalent percent) |

Example 11

The general procedure of Example 1 was followed except that the following amounts of reactants were employed:

| UNIDYME 14 ™ | 1787.91 g |
| --- | --- |
| | (65.0 equivalent percent) |
| Azelaic Acid | 316.46 g |
| | (35.0 equivalent percent) |
| EDA | 81.44 g |
| | (28.1 equivalent percent) |
| Piperazine | 314.19 g |
| | (75.9 equivalent percent) |

0.5 g of EDA was added during the reaction as an amine correction.

Comparative Example A

The general procedure of Example 1 was followed except that the following amounts of reactants were employed:

| UNIDYME 14 ™ | 1921.32 g |
| --- | --- |
| | (75 equivalent percent) |
| Azelaic Acid | 210.52 g |
| | (25 equivalent percent) |
| EDA | 67.56 g |
| | (25 equivalent percent) |
| Piperazine | 300.60 g |
| | (78 equivalent percent) |

7.9 g of EDA was added during the reaction as an amine correction.

Comparative Example B

The general procedure of Example 1 was followed except that the following amounts of reactants were employed:

| UNIDYME 14 ™ | 1930.22 g |
| --- | --- |
| | (75 equivalent percent) |
| Azelaic Acid | 211.49 g |
| | (25 equivalent percent) |
| EDA | 95.02 g |
| | (35 equivalent percent) |
| Piperazine | 263.27 g |
| | (68 equivalent percent) |

0.4 g of EDA was added during the reaction as an amine correction.

Comparative Example C

The general procedure of Example 1 was followed except that the following amounts of reactants were employed:

| UNIDYME 14 ™ | 1797.04 g |
| --- | --- |
| | (65 equivalent percent) |
| Azelaic Acid | 318.07 g |
| | (35 equivalent percent) |
| EDA | 102.07 g |
| | (35 equivalent percent) |
| Piperazine | 282.82 g |
| | (68 equivalent percent) |

3.3 g of EDA was added during the reaction as an amine correction.

Comparative Example D

The general procedure of Example 1 was followed except that the following amounts of reactants were employed:

| UNIDYME 14 ™ | 1951.43 g |
| --- | --- |

-continued

| | |
|---|---|
| Azelaic Acid | (77.1 equivalent percent)<br>190.52 g |
| EDA | (22.9 equivalent percent)<br>80.09 g |
| | (30.0 equivalent percent) |
| Piperazine | 277.95 g |
| | (73.0 equivalent percent) |

5.8 g of EDA was added during the reaction as an amine correction.

Comparative Example E

The general procedure of Example 1 was followed except that the following amounts of reactants were employed:

| | |
|---|---|
| UNIDYME 14 ™ | 1867.89 g |
| | (70.0 equivalent percent) |
| Azelaic Acid | 263.14 g |
| | (30.0 equivalent percent) |
| EDA | 104.43 g |
| | (37.1 equivalent percent) |
| Piperazine | 264.54 g |
| | (65.9 equivalent percent) |

4.3 g of EDA was added during the reaction as an amine correction.

Comparative Example F

The procedure of Example 1 was followed except that the following amounts of reactants were employed:

| | |
|---|---|
| UNIDYME 14 ™ | 1855.25 g |
| | (70.0 equivalent percent) |
| Azelaic Acid | 261.36 g |
| | (30.0 equivalent percent) |
| EDA | 64.02 g |
| | (22.9 equivalent percent) |
| Piperazine | 319.37 g |
| | (58.7 equivalent percent) |

3.9 g of EDA was added during the reaction as an amine correction.

Comparative Example G

The procedure of Example 1 was followed except that the following amounts of reactants were employed:

| | |
|---|---|
| UNIDYME 14 ™ | 1863.91 g |
| | (70 equivalent percent) |
| Azelaic Acid | 262.58 g |
| | (30 equivalent percent) |
| EDA | 101.12 g |
| | (36 equivalent percent) |
| Piperazine | 272.39 g |
| | (68 equivalent percent) |

3.9 g of EDA was added during the reaction as an amine correction.

The properties and characteristics of the various polyamide resin compositions are detailed in Table I and II and elsewhere below and were determined follows:

1) The Softening Point (°C.) was measured by conventional "Ball and Ring" melting point determinations ASTM D 3461-76;

2) Amine No. is the milligrams of KOH equivalent to amine alkalinity in one gram sample of composition;

3) Acid No. is the milligrams of KOH equivalent to acidity in one gram sample of composition;

4) Melt viscosity (Visc 205) reported in centpoise (cps) was measured by adding approximately 9 g of resin to a sample chamber (Brookfield Thermocel) which is then heated to the test temperature, suitable to provide a molten state. A spindle (SC4-31) is attached to a rotational motor capable of sensing torque. This spindle is immersed into the sample and rotated until the temperature has equilibrated (205° C.). Either a torque factor or a direct readout may be possible depending on the model viscometer (Brookfield Rotational Viscometer model LVT).

5) Gardner Holdt viscosity of 40% NV n-propanol solution was measured by comparing the rate a bubble rises through a resin solution of known volume, concentration and temperature against viscosity standard tubes in a constant temperature water bath (25° C.). Results are converted and expressed as cps (conversion tables allow the viscosity results to be treated statistically).

6) Ethanol reducibility (Etoh Reduc) was measured as follows: 20 g of polyamide resin are introduced into a 250 ml Erlenmeyer flask and dissolved in 30 g of n-propanol with heat and agitation. The solution is cooled and pure ethyl alcohol is then added from a burette with constant swirling until the solution starts to cloud.

Ethanol reducibility is expressed as the percent of polyamide resin then contained in the diluted, still barely clear solution.

7) Viscosity stability is the Gardner viscosity, as described above, after 72 hrs divided by the initial Gardner viscosity.

8) Foil adhesion is measured by making 40% nonvolatile solutions in alcohol using the laminating polyamide resins. The resin is applied to 4×10 inch pieces of corona treated aluminum foil using a #4 Meyer coated wire wound rod and allowed to dry. A Sentinel Heat Sealer (Packaging Industries, Hyannis, MA) is set to 200° F., 60 psi and 5 seconds. (Allow 15 minutes for temperature to equilibrate.) An un-printed piece of foil is placed on top of a printed sample and sealed in the Sentinel sealer. The sample is cut into one inch wide strips. Using a "T-Peel" method of 12 inches per minute on an Instron tester (Instron 4201 Tester, Instron Corp., Canton, MA), the samples are rated in grams per inch at maximum load.

9) Low temperature adhesion is measured as described under Foil Adhesion except that the temperature on the Sentinel is reduced to 150° F.

In the foil adhesion tests, all compositions showed comparable performance. Similarly, in the low temperature adhesion tests, all compositions demonstrated comparable performance in that laminates of all compositions exhibited destructive failure in T-peel testing on various substrates.

TABLE I

| | Example No. | | | | | | | | | | |
|---|---|---|---|---|---|---|---|---|---|---|---|
| | 1 | 2 | 3 | 4 | 5 | 6 | 7 | 8 | 9 | 10 | 11 |
| Softening Pt. | 123 | 120 | 126 | 129 | 137 | 115 | 122 | 125 | 127 | 131 | 127 |

TABLE I-continued

| | Example No. | | | | | | | | | | |
|---|---|---|---|---|---|---|---|---|---|---|---|
| | 1 | 2 | 3 | 4 | 5 | 6 | 7 | 8 | 9 | 10 | 11 |
| Acid No. | 2.0 | 1.9 | 1.5 | 1.2 | 1.9 | 2.7 | 1.8 | 1.6 | 1.0 | 1.2 | 1.7 |
| Amine No. | 7.8 | 5.4 | 6.7 | 6.2 | 6.9 | 6.8 | 5.4 | 7.4 | 6.9 | 7.2 | 6.7 |
| Visc. 205° C. | 13200 | 37250 | 21200 | 41000 | 27500 | 17200 | 70000 | 17440 | 40800 | 28200 | 24750 |
| Gardner visc. | 2400 | 6100 | 3700 | 4100 | 3700 | 3067 | 7667 | 2833 | 5567 | 4100 | 3900 |
| Etoh Reduc., % | 20.4 | 23.5 | 22.7 | 22.9 | 20.8 | 23.5 | 22.3 | 22.3 | 19.0 | 21.5 | 20.4 |
| Mn | 2449 | 2508 | 3037 | 2768 | 3045 | 4561 | 3679 | 2792 | 3294 | 1692 | 2773 |
| MW | 11651 | 10293 | 14241 | 15337 | 13106 | 17137 | 18652 | 14193 | 20905 | 12394 | 16227 |
| Visc. Stab. | 1.0360 | 1.0174 | 1.0871 | 1.0664 | 1.5786 | 1.0174 | 1.0582 | 1.2049 | 1.0330 | 1.3133 | 1.0967 |

TABLE II

| | Comparative Example No. | | | | | | |
|---|---|---|---|---|---|---|---|
| | A | B | C | D | E | F | G |
| Softening Pt. | 103 | 121 | 137 | 112 | 130 | 111 | 131 |
| Acid No. | .9 | 1.5 | 1.6 | 1.9 | 3.0 | 1.8 | 1.1 |
| Amine No. | 7.9 | 5.2 | 6.7 | 6.4 | 8.2 | 7.0 | 8.0 |
| Visc. 205° C. | 17700 | 67500 | 50500 | 33500 | 6520 | 22500 | 18200 |
| Gardner visc. | 2833 | 6933 | 5567 | 5033 | 1733 | 3900 | 2950 |
| Etoh Reduc., % | 24.5 | 24.0 | 24.4 | 25.4 | 21.6 | 22.9 | 21.9 |
| Mn | 3151 | 3449 | 2784 | 3641 | 2118 | 2112 | 2204 |
| MW | 14629 | 13426 | 11693 | 15907 | 8848 | 11762 | 11717 |
| Visc. Stab. | 0.9931 | 1.0174 | 2.0659 | 0.9946 | 1.7476 | 1.3961 | 1.6882 |

What is claimed is:

1. A polyamide resin composition for use as laminating ink resin binder which comprises the condensation reaction product of: (a) a $C_{36}$ dimerized fatty acid; (b) at least one $C_6$ to $C_{10}$ dibasic acid; (c) at least one $C_1$–$C_4$ alkyl diamine; and (d) at least one piperazine-like diamine; the equivalents of amine groups being substantially equal to the equivalents of carboxyl groups, where 35 to 45 equivalent percent of the carboxyl groups are contributed by the dibasic acid component, 55 to 65 equivalent percent of the carboxyl groups are contributed by the dimerized fatty acid component and 78 to 88 equivalent percent of the amine groups are contributed by the piperazine-like diamine component.

2. The polyamide resin composition according to claim 1 the dibasic acid is azelaic acid.

3. The polyamide resin composition according to claim 1 wherein the piperazine-like diamine is piperazine.

4. The polyamide resin composition according to claim 1 wherein the $C_1$ to $C_4$ alkyl diamine is ethylenediamine.

5. A polyamide resin composition for use as laminating ink resin binder which comprises the condensation reaction product of: (a) about 60 equivalent percent of a $C_{36}$ dimerized fatty acid; (b) about 40 equivalent percent azelaic acid; (c) ethylenediamine in an amount sufficient to provide about 2 to about 6 equivalent percent excess of amine groups; and (d) about 83 equivalent percent piperazine.

6. A printing ink comprising: (a) a $C_2$–$C_4$ aliphatic alcohol solvent, (b) a polyamide resin composition which comprises the condensation reaction product of: (a) a $C_{36}$ dimerized fatty acid; (b) at least one $C_6$ to $C_{10}$ dibasic acid; (c) at least one $C_1$–$C_4$ alkyl diamine; and (d) at least one piperazine-like diamine; the equivalents of amine groups being substantially equal to the equivalents of carboxyl groups, where 30 to 50 equivalent percent of the carboxyl groups are contributed by the dibasic acid component and 73 to 93 equivalent percent of the amine groups are contributed by the piperazine-like diamine component, and (c) a colorant distributed through the printing ink in an effective amount sufficient to impart a color to the resulting printing ink.

7. The printing ink according to claim 6 wherein the dibasic acid is azelaic acid.

8. The printing ink according to claim 6 wherein the piperazine-like diamine is piperazine.

9. The printing ink according to claim 6 wherein the $C_1$ to $C_4$ alkyl diamine is ethylenediamine.

10. A printing ink comprising:
an alcohol solvent,
a polyamide resin composition which comprises the condensation reaction product of: (a) a $C_{36}$ dimerized fatty acid; (b) at least one $C_6$ to $C_{10}$ dibasic acid; (c) at least one $C_1$–$C_4$ alkyl diamine; and (d) at least one piperazine-like diamine; the equivalents of amine groups being substantially equal to the equivalents of carboxyl groups, where 35 to 45 equivalent percent of the carboxyl groups are contributed by the dibasic acid component, 55 to 65 equivalent percent of the carboxyl groups are contributed by the dimerized fatty acid component and 78 to 88 equivalent percent of the amine groups are contributed by the piperazine-like diamine component, and
a colorant distributed through the printing ink in an effective amount sufficient to impart a color to the resulting printing ink.

11. The printing ink according to claim 10 wherein the dibasic acid is azelaic acid.

12. The printing ink according to claim 10 wherein the piperazine-like diamine is piperazine.

13. The printing ink according to claim 10 wherein the $C_1$ to $C_4$ alkyl diamine is ethylenediamine.

14. The printing ink according to claim 10 wherein the alcohol solvent is comprised primarily of a $C_2$–$C_4$ aliphatic alcohol.

15. A printing ink comprising:
a $C_2$–$C_4$ aliphatic alcohol solvent,
a polyamide resin composition which comprises the condensation reaction product of: (a) about 60 equivalent percent of a $C_{36}$ dimerized fatty acid; (b) about 40 equivalent percent azelaic acid; (c) ethylenediamine in an amount sufficient to provide about 2 to about 6 equivalent percent excess of amine groups; and (d) about 83 equivalent percent piperazine, and
a colorant distributed through the printing ink in an effective amount sufficient to impart a color to the resulting printing ink.

* * * * *